Figure 1:
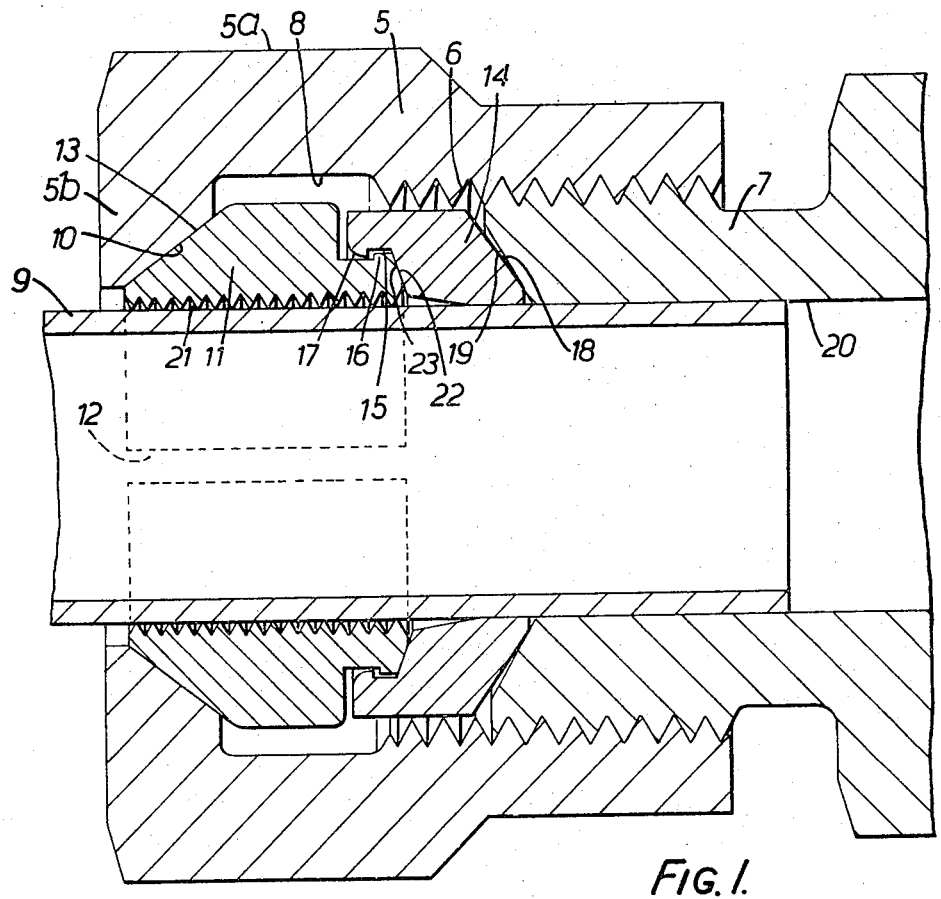

United States Patent
Clague

[15] 3,695,640
[45] *Oct. 3, 1972

[54] PIPE COUPLINGS

[72] Inventor: John Henry Clague, Douglas Isle of Man, Great Britain

[73] Assignee: Mannin Engineering Limited, Douglas Isle of Man, Great Britain

[ * ] Notice: The portion of the term of this patent subsequent to June 1, 1988, has been disclaimed.

[22] Filed: April 22, 1970

[21] Appl. No.: 28,283

Related U.S. Application Data

[63] Continuation of Ser. No. 695,467, Jan. 3, 1968, abandoned.

[30] Foreign Application Prioirty Data

Aug. 26, 1967 Great Britain............39371/67

[52] U.S. Cl. ...................285/116, 285/341, 285/379
[51] Int. Cl..............................................F16l 19/06
[58] Field of Search......285/341, 342, 339, 379, 343, 285/356, 348, 382.7

[56] References Cited

UNITED STATES PATENTS

| | | | |
|---|---|---|---|
| 2,320,813 | 6/1943 | Cowles | 285/382.7 X |
| 2,127,611 | 8/1938 | Mueller | 285/342 |
| 3,074,747 | 1/1963 | Boughton | 285/342 |
| 2,523,874 | 9/1950 | Moore | 285/356 X |

FOREIGN PATENTS OR APPLICATIONS

| | | | |
|---|---|---|---|
| 1,048,103 | 12/1958 | Germany | 285/356 |
| 453,217 | 3/1936 | Germany | 285/343 |

Primary Examiner—David J. Williamowsky
Assistant Examiner—Wayne L. Shedd
Attorney—Young & Thompson

[57] ABSTRACT

A pipe coupling comprises a screw-threaded member to surround the pipe and adapted for threaded engagement with a body bored to receive the extremity of the pipe, a tapered split collar for engagement with a corresponding taper on an inner surface of the threaded member to permit contraction on the collar into gripping engagement with the pipe and a separate non-split sealing device attached to the split collar to effect sealing engagement between the pipe and the body. The sealing device is removably attached to the split collar by being sprung into engagement therewith under radial contraction of the collar which expands again when a lip and rebate formation between the collar and the sealing device comes into operation.

18 Claims, 4 Drawing Figures

PIPE COUPLINGS

This application is a streamlined continuation of copending application Ser. No. 695,467, filed Jan. 3, 1968 and now abandoned.

This invention relates to pipe couplings of the flareless type, that is to say to pipe couplings which grip the outer cylindrical surface of the pipe in effecting the coupling and thereby render it unnecessary to provide the pipe with a flared end for this purpose. The invention finds particular, though not exclusive, application to pipe couplings for high pressure systems, especially high pressure hydraulic systems.

In flareless couplings it is usual to provide an externally tapered collar adapted to surround the pipe, and a member having a corresponding internal tapered surface to engage the collar and a screw-threaded formation to engage a body to which the pipe is to be coupled. It is also usual to provide a sealing member to prevent fluid leakage between the pipe and the body. The inner periphery of the collar is generally roughened or provided with teeth or serrations to grip the outer cylindrical surface of the pipe.

The main object of the present invention is to provide an improved pipe coupling which is simple and efficient in operation, compact and capable of being held in stores without having to separately store a number of loose parts.

According to the invention a pipe coupling comprises a screw-threaded member to surround the pipe and adapted for threaded engagement with a body bored to receive the extremity of the pipe, a tapered split collar for engagement with a corresponding taper on an inner surface of the threaded member to permit contraction of the collar into gripping engagement with the pipe and a separate non-split sealing device to effect sealing engagement between the pipe and the body in which the sealing device is attached to the split collar.

Preferably the sealing device is removably attached to the split collar by being sprung into engagement therewith under radial contraction of the collar which expands again when a lip on the collar enters a rebate on the sealing device.

In one form of the pipe coupling the screw-threaded member is a nut, and is accordingly internally threaded for engagement with the body, and the collar is so dimensioned that it is an interference fit with the threads of the nut but can nevertheless be passed through the threaded portion of the nut, by radial contraction of the split collar, into a rebated portion of the nut where the collar expands again and is retained. In another form of the pipe coupling the screw-threaded member is a hollow stud, and is accordingly externally threaded for engagement with the body, and the collar is formed with a lip which is an interference fit with a portion of the said inner surface of the hollow stud but can nevertheless be passed through said portion, by radial contraction of the split collar, into a rebated portion of the hollow stud where the collar expands again and is retained by the lip.

Thus, when the threaded member is in the form of a hollow stud, the elastic radial contraction and expansion of the collar due to its longitudinally split form is utilized at both ends, in order to effect attachment not only of the sealing device to the collar but also of the collar to the hollow stud.

If desired the sealing device may comprise a non-metallic sealing member and a non-split metallic carrier by which the sealing member is attached to the split collar. Preferably the sealing device has a tapered surface to engage a correspondingly tapered seat on the body so that the sealing device is pressed into wedging engagement with the seat, said sealing device also having a positive abutment surface for engagement with the body to limit the compression on the sealing device and thereby avoid overloading it.

When the sealing member is non-metallic and provided with a metallic carrier as aforesaid, the foregoing positive abutment surface may be formed on the non-split metallic carrier and engage with the body to limit the compression on the non-metallic sealing member which is formed with the said tapered surface. Also when a non-metallic sealing member is employed the arrangement of parts is preferably such that when under load the sealing member is trapped to prevent its extrusion.

In accordance with a further feature of the invention the tapered split collar may also be formed with another and oppositely tapered surface to engage with a corresponding taper on the sealing device so that the collar is subjected to radial compression at both its ends when the screw-threaded member is tightened.

Figure 2:
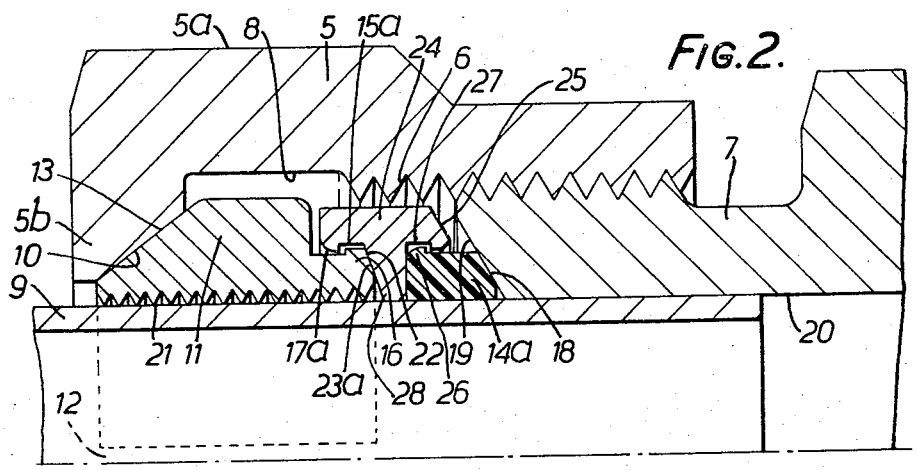
Figure 3:
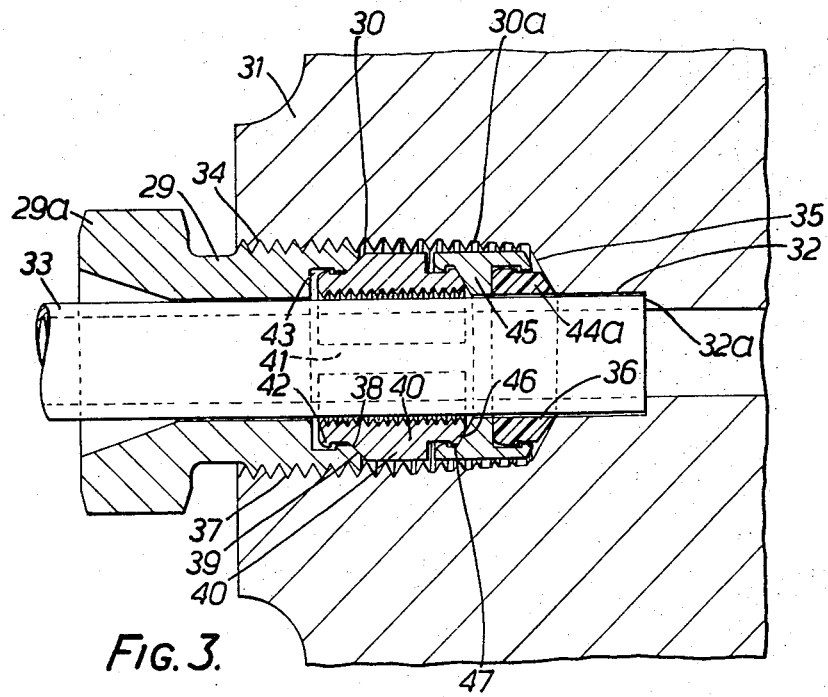
Figure 4:
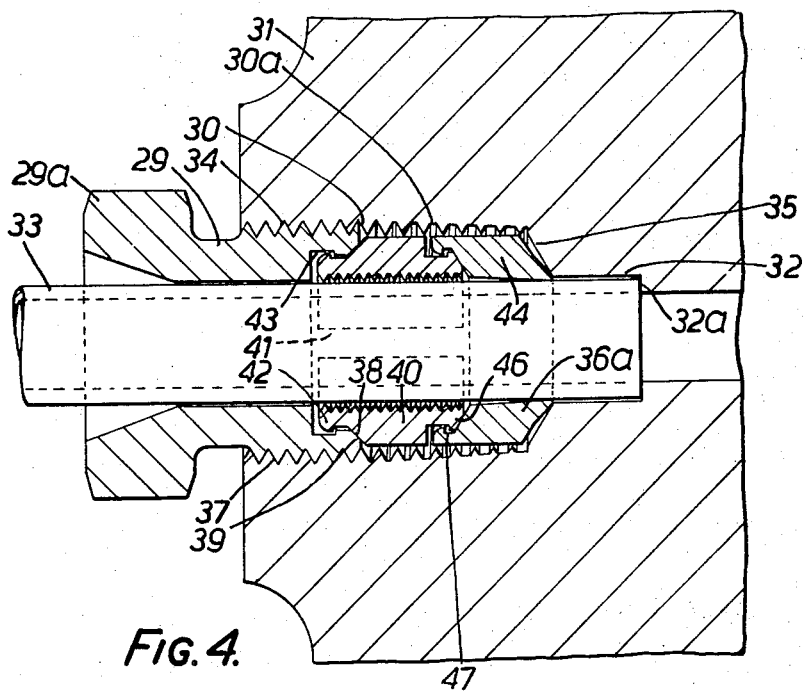

The invention will now be described as applied to make-and-break pipe couplings for carrying hydraulic fluid at high pressure. Several specific embodiments are illustrated, by way of example, in the accompanying drawings, in which:

FIG. 1 is an axial section through one pipe coupling, in accordance with the invention, employing a nut, tapered collar and metal sealing member, the coupling being shown engaged with the body of a component, FIG. 2 is a similar view to FIG. 1 but employing a non-metallic sealing member, FIG. 3 illustrates, in axial section, the application of the invention to the hollow stud coupling of our copending British application No. 39370/67 and U.S. application Ser. No. 695,475, a non-metallic sealing member being employed, and FIG. 4 is a similar view to FIG. 3 but employing a metal sealing member.

Referring to FIGS. 1 and 2, the screw-threaded member of the coupling is a sleeve nut 5 threaded at 6 to screw on to a male thread on the body 7 of a component, such as a pump, valve, ram, motor or other accessory carrying the fluid. The sleeve nut 5 has one end unthreaded and at that end the hexagon or other head 5a of the nut is formed with an internal annular rebate 8 extending between the end of the internally threaded sleeve portion 6 of the nut and an inward radial flange 5b forming a partially closed end of the head 5a which leaves the nut as a loose fit over the pipe 9 with which it is to be used. The inner periphery of the flange 5b is formed by a tapered surface 10 which extends from the end of the annular rebate 8 to the end or near the end of the nut. A metal collar 11 longitudinally split at 12 and having a corresponding external taper 13 at one end is adapted to be received within the nut, in a manner to be described, where its external taper 13 lies against the internal taper 10 on the nut.

A sealing device comprising a non-split annular member 14 (FIG. 1) or 14a (FIG. 2) is attached to the other end of the collar 11. For certain applications of the pipe coupling the sealing member 14 may be of metal while in couplings intended for other purposes it may be of a non-metallic material such, for example, as a synthetic plastic, as shown at 14a in FIG. 2. The sealing device is of smaller outside diameter than that of the collar 11 and is attached to the latter so as to be readily detachable therefrom. Thus, referring to FIG. 1, when a metal sealing member 14 is employed it may be formed, at its end for attachment to the collar 11, with an annular recess or rebate 15 in an internal surface and with which an outwardly projecting peripheral lip 16 on a portion of reduced diameter at the adjacent end of the collar engages. The extremity of the recessed or rebated portion of the sealing member 14 is itself formed with a lip having a radiused outer edge 17.

Due to the foregoing arrangement the sealing member 14 may be sprung into engagement with the collar 11 which suffers radial contraction due to its split 12 and then springs outwardly again when its lip 16 reaches the recess or rebate 15 in the sealing member so that the two parts are held together with the sealing member forming a smaller diameter extension of the collar. The other end of the sealing member 14 has a tapered surface 18, oppositely inclined to the taper 13 on the collar 11, for engagement with an internal chamfer 19 on the end of the body 7 which forms a tapered seat for the sealing member 14. As already mentioned, the collar 11 is an interference fit with the threads 6 of the nut 5 but, with the sealing member 14 attached to it as already described, can be passed through the threaded portion of the nut by radial contraction of the collar into the annular rebate 8 of the nut where it expands again and is retained, retaining the sealing member 14 with it.

In use the assembled coupling, consisting of the nut 5, split collar 11 and non-split sealing member 14 held captive with the nut, is passed over the end of the pipe 9 which is then inserted into the bore 20 of the body 7 of the component. Such bore may be a plain cylindrical bore without any internal shoulder so that the exact length and position of the ends of the pipe 9 are not critical. When the nut 5 is tightened on the body, the collar 11 first presses the sealing member 14 into contact with the body 7 so that the tapered surface 18 of the sealing member is wedged against the tapered seat 19 on the body and against the pipe 9 so as to form a good fluid seal with the pipe and the body. On further tightening of the nut 5 the collar 11 is radially contracted, its internal cylindrical surface being roughened or finely toothed or serrated, as shown at 21, to grip the pipe firmly, so that endwise movement of the pipe is prevented even against the highest pressures.

To increase the gripping effect still further the end of the collar 11 to which the sealing member 14 is attached is formed with an oppositely tapered surface 22 to the tapered surface 13 engaged by the nut 5 and engages with a corresponding taper 23 on the sealing member 14. Due to this formation the reaction force of the sealing member 14 on the collar 11 has an inward radial component, so that the collar is subjected to radial compression by the tapered surface 10 of the nut at one end and by the tapered surface 23 of the sealing member at the other. In view of the fact that the fine teeth or serrations 21 of the collar do not damage the pipe the joint can be made and remade an infinite number of times without replacing any of the parts.

Referring to FIG. 2, when a non-metallic sealing member 14a is employed, a device is provided which serves to limit the compression on the sealing member and thereby avoids overloading it. To achieve this the plastic sealing member 14a, which provides the tapered surface 18 for engagement with the tapered seat 19 on the body, is attached to an annular non-split metallic carrier 24, the complete sealing device consisting of sealing member 14a and carrier 24 being attached to the collar 11 as before. It will be seen that the tapered surface 18 of the plastic sealing member 14a which engages with the tapered seat 19 on the body protrudes only a short distance from the adjacent end of the metallic carrier 24 which provides a further abutment surface 25 surrounding the tapered surface 18 of the sealing member and adapted to engage with the outer portion of the tapered seat 19 of the body. The arrangement is such that when sufficient end load has been applied to the sealing member 14a the two surfaces 25 and 19 come into abutment to prevent further wedging action of the tapered surface 18 of the sealing member against the tapered seat.

It will be understood that, with the foregoing arrangement of non-metallic sealing member 14a and metallic carrier 24, the carrier provides the taper 23a, equivalent to the taper 23 of FIG. 1, for engagement with the tapered surface 22 of the collar 11. At the end of the carrier 24 adjacent the collar 11 it is formed with an annular recess or rebate 15a, corresponding to the recess or rebate 15 in the sealing member 14 of FIG. 1, for engagement with the outwardly projecting peripheral lip 16 on the collar. The carrier is also formed with a lip having a radiused outer edge 17a, all as already described for the metal sealing member 14 of FIG. 1. At the end of the carrier providing the abutment surface 25 the plastic sealing member 14a is attached thereto by means of a lip and rebate formation 26, 27 similar to those already described, the two parts being sprung into engagement with each other.

A non-split metallic washer is preferably interposed between the end of the plastic sealing member 14a and the split collar 11. Such washer may either be constituted by an integral portion of the carrier 24, i.e., so that it forms an annular rib 28 projecting radially inwards therefrom, or it may be a separate element. In either case the purpose is to ensure that when under load the plastic sealing member is trapped exteriorly and at its end by non-split metallic elements to prevent its extrusion.

In the application of the invention to the coupling of our copending application No. 39370/67 in which the screw-threaded member is a hollow stud 29 (FIGS. 3 and 4) adapted to screw into a female thread 30 in the body 31 of the component, the body is formed with a bore 32 of such diameter as to receive the end of the pipe 33 but is counterbored, as shown at 34, at its outer end and the counterbore is tapped to provide the thread 30. From a point where the full-thread tapping ends the counterbore tapers slightly to form a thread run-out 30a at the end of which it passes into the normal size bore 32 by way of a coarse angle chamfer 35. The normal size bore 32 is then provided with a shoulder 32a for the pipe end to abut and thus to ensure that the pipe 33 extends beyond the sealing member 36 or 36a of the coupling. The tapped portion 30 of the counterbore is adapted to receive the hollow stud 29 the shank of which is externally screwed, as shown at 37, to take into the tapping 30 of the counterbore whilst its inside diameter is plain and dimensioned so that the stud is a sliding fit on the pipe 33. The screwed shank of the stud is of such length that it does not bottom in the tapped portion 30 of the counterbore when screwed home by means of the hexagon head 29a or other tightening means with which it is provided. At the inner end of the stud opposite that with the hexagon head the shank is formed with an internal tapered surface 38 which engages with a corresponding external tapered portion 39 of a collar 40, longitudinally split as shown at 41, which projects beyond the end of the shank and is received within the thread run-out portion 30a of the counterbore.

The collar 40 is formed with a short, reduced diameter extension at the smaller end of its taper 39 and such extension is formed with an outwardly turned peripheral lip 42 which is an interference fit with a portion of the bore of the stud shank at the smaller end of its internal tapered surface 38, the bore being rebated beyond the said portion, as shown at 43. Due to this arrangement the collar 40 may be sprung into engagement with the hollow stud 29 at the internally tapered end of the latter, radial contraction of the split collar 40 occurring as its lip 42 passes the interference portion of the bore followed by re-expansion of the collar as its lip is received in the rebated portion 43 of the bore of the stud. Thereby the collar is held captive with the stud. The sealing device, consisting of a non-metallic sealing member 44a and metal carrier 45 in FIG. 3 and a metal sealing member 44 in FIG. 4, is attached to the split collar 40 by means of a lip and rebate formation 46,47 as already described in the previous constructions, and so the elastic radial contraction and expansion of the collar 40 is utilized in order to provide both for the attachment of the collar 40 to the hollow stud 29 and for the attachment of the sealing device to the collar. The non-metallic sealing member 44a (FIG. 3) may be of plastic attached to the metal carrier 45 as before, the general arrangement of parts of the sealing device of FIG. 3 also being similar to that already described with reference to FIG. 2 while the sealing device arrangement of FIG. 4 is similar to that of FIG. 1.

Having described my invention, I claim:

1. A pipe coupling comprising a screw-threaded member to surround the pipe and in threaded engagement with a body bored to receive the extremity of the pipe, said member having an annular recess adjacent the threads and intermediate the ends thereof, a tapered split collar in engagement with a corresponding taper on an inner surface of the threaded member to permit contraction of the collar into gripping engagement with the pipe, and a separate nonsplit sealing device to effect sealing engagement between the pipe and the body, the sealing device being pressed into engagement between the pipe and the body, the threaded member and the collar and the sealing device being detachably interconnected against axial separation from each other, the split of the collar permitting the sealing device and split collar to be removably sprung into engagement with each other and permitting the split collar to be sprung into said annular recess whereby the collar is in removable sprung engagement with the threaded end of the threaded member.

2. A pipe coupling as claimed in claim 1, the collar and the sealing device having oppositely radially extending portions thereon that engage one behind the other releasably to retain the collar and the sealing device together, and the collar and the threaded member having oppositely radially extending portions thereon that engage one behind the other releasably to retain the collar and the threaded member together.

3. A pipe coupling as claimed in claim 1, the threaded member being a nut which is internally threaded for engagement with the body, the collar being so dimensioned that it is an interference fit with the threads of the nut but can nevertheless be passed through the threaded portion of the nut by radial contraction of the split collar into said annular recess of the nut where the collar expands again and is retained.

4. A pipe coupling as claimed in claim 1, the taper on said split collar being disposed adjacent the end of the threaded member at the back of said annular recess into which the split collar is sprung for removable attachment thereof.

5. A pipe coupling as claimed in claim 1, said split collar snapping inside the adjacent end of said sealing device for the removable attachment thereof, said split collar having a peripheral external lip adjacent the end remote from said member and said sealing device having an internal recess which is engaged by said lip when the collar and sealing device are sprung into engagement thereby utilizing the natural resilience and radial compressibility of the collar.

6. A pipe coupling as claimed in claim 5, said sealing device comprising a nonmetallic sealing member which seals against said body and a metallic seal carrier by which the sealing member is carried, said carrier and said split collar being removably sprung into engagement with each other.

7. A pipe coupling comprising a screw-threaded member to surround the pipe and in threaded engagement with a body bored to receive the extremity of the pipe, a tapered split collar in engagement with a corresponding taper on an inner surface of the threaded member to permit contraction of the collar into gripping engagement with the pipe, and a separate nonsplit sealing device to effect sealing engagement between the pipe and the body, the sealing device being pressed into engagement between the pipe and the body, the threaded member and the collar and the sealing device being detachably interconnected against axial separation from each other, the split of the collar permitting the sealing device and split collar to be removably sprung into engagement with each other and permitting the split collar and the threaded member to be removably sprung into engagement with each other, the threaded member being a nut which is internally threaded for engagement with the body and has an internal rebated portion adjacent the inner end of the internally threaded portion, the collar being so dimensioned that it is an interference fit with the threads of the nut but can nevertheless be passed through the threaded portion of the nut by radial contraction of the split collar into the rebated portion of the nut where the collar expands again and is retained.

8. A pipe coupling comprising a screw-threaded member to surround the pipe and in threaded engagement with a body bored to receive the extremity of the pipe, a tapered split collar in engagement with a corresponding taper on an inner surface of the threaded member to permit contraction of the collar into gripping engagement with the pipe, and a separate nonsplit sealing device to effect sealing engagement between the pipe and the body, the sealing device being pressed into engagement between the pipe and the body, the threaded member and the collar and the sealing device being detachably interconnected against axial separation from each other, the split of the collar permitting the sealing device and split collar to be removably sprung into engagement with each other and permitting the split collar and the threaded member to be removably sprung into engagement with each other, said sealing device comprising a nonmetallic sealing member and a nonsplit carrier by which the sealing member is attached to the split collar.

9. A pipe coupling comprising a screw-threaded member to surround the pipe and in threaded engagement with a body bore to receive the extremity of the pipe, a tapered split collar in engagement with a corresponding taper on an inner surface of the threaded member to permit contraction of the collar into gripping engagement with the pipe, and a separate nonsplit sealing device to effect sealing engagement between the pipe and the body, the sealing device being pressed into engagement between the pipe and the body, the threaded member and the collar and the sealing device being detachably interconnected against axial separation from each other, the split of the collar permitting the sealing device and split collar to be removably sprung into engagement with each other and permitting the split collar and the threaded member to be removably sprung into engagement with each other, said sealing device having a nonmetallic elastic deformable portion and a positive abutment surface for engagement with the body to limit the compression of said elastic deformable portion and thereby avoid overloading it.

10. A pipe coupling as claimed in claim 9, said abutment surface being a surface of a nonsplit metallic carrier.

11. A pipe coupling as claimed in claim 10, said elastic deformable portion having a radially outwardly extending portion that engages behind a radially inwardly extending portion of said nonsplit metallic carrier to retain said nonsplit metallic carrier and said elastic deformable portion together.

12. A pipe coupling comprising a screw-threaded member to surround the pipe and in threaded engagement with a body bored to receive the extremity of the pipe, a tapered split collar in engagement with a corresponding taper on an inner surface of the threaded member to permit contraction of the collar into gripping engagement with the pipe, and a separate nonsplit sealing device to effect sealing engagement between the pipe and the body, the sealing device being pressed into engagement between the pipe and the body, the threaded member and the collar and the sealing device being detachably interconnected against axial separation from each other, the split of the collar permitting the sealing device and split collar to be removably sprung into engagement with each other and permitting the split collar and the threaded member to be removably sprung into engagement with each other, the taper on said split collar being disposed adjacent the end of the threaded member at the back of an internal annular end recess into which the split collar is sprung for removable attachment thereof.

13. A pipe coupling comprising a screw-threaded member to surround the pipe and in threaded engagement with a body bored to receive the extremity of the pipe, a tapered split collar in engagement with a corresponding taper on an inner surface of the threaded member to permit contraction of the collar into gripping engagement with the pipe, and a separate nonsplit sealing device to effect sealing engagement between the pipe and the body, the sealing device being pressed into engagement between the pipe and the body, the threaded member and the collar and the sealing device being detachably interconnected against axial separation from each other, the split of the collar permitting the sealing device and split collar to be removably sprung into engagement with each other and permitting the split collar to be removably sprung into engagement with the threaded end of the threaded member, said split collar snapping inside the adjacent end of said sealing device for the removable attachment thereof, said split collar having a peripheral external lip adjacent the end remote from said member and said sealing device having an internal recess which is engaged by said lip when the collar and sealing device are sprung into engagement thereby utilizing the natural resilience and radial compressibility of the collar.

14. A pipe coupling as claimed in claim 13, said sealing device comprising a nonmetallic sealing member which seals against said body and a metallic seal carrier by which the sealing member is carried, said carrier and said split collar being removably sprung into engagement with each other.

15. A pipe coupling comprising a screw-threaded member to surround the pipe and in threaded engagement with a body bored to receive the extremity of the pipe, said member having an annular recess adjacent the threads thereof, a tapered split collar in engagement with a corresponding taper on an inner surface of the threaded member to permit contraction of the collar into gripping engagement with the pipe, and a separate nonsplit sealing device comprising a nonmetallic sealing member to effect sealing engagement between the pipe and the body and a nonsplit carrier by which the sealing member is attached to the split collar, the sealing device being pressed into engagement between the pipe and the body, the threaded member and the collar and the sealing device being detachably interconnected against axial separation from each other, and the split of the collar permitting the nonsplit carrier of the sealing device and the split collar to be removably sprung into engagement with each other and permitting the split collar to be sprung into said annular recess whereby the collar and the threaded member are removably sprung into engagement with each other.

16. A pipe coupling comprising a screw-threaded member to surround the pipe and in threaded engagement with a body bored to receive the extremity of the pipe, said member having an annular recess adjacent the threads thereof, a tapered split collar in engagement with a corresponding taper on an inner surface of the threaded member to permit contraction of the collar into gripping engagement with the pipe, and a separate nonsplit sealing device having a nonmetallic elastic deformable portion to effect sealing engagement between the pipe and the body and also having a positive abutment surface for engagement with the body to limit the compression of said elastic deformable portion and thereby avoid overloading it, the sealing device being pressed into engagement between the pipe and the body, the threaded member and the collar and the sealing device being detachably interconnected against axial separation from each other, the split of the collar permitting the sealing device and split collar to be removably sprung into engagement with each other and permitting the split collar to be sprung into said annular recess whereby the collar and the threaded member are removably sprung into engagement with each other.

17. A pipe coupling as claimed in claim 16, said abutment surface being a surface of a nonsplit metallic carrier.

18. A pipe coupling as claimed in claim 17, said elastic deformable portion having a radially outwardly extending portion that engages behind a radially inwardly extending portion of said nonsplit metallic carrier to retain said nonsplit metallic carrier and said elastic deformable portion together.

* * * * *